(12) United States Patent
Robinson

(10) Patent No.: US 7,705,827 B1
(45) Date of Patent: Apr. 27, 2010

(54) ERGONOMIC COMPUTER MOUSE

(76) Inventor: Allen W. Robinson, 63286 C.R. 19, Goshen, IN (US) 46526

( * ) Notice: Subject to any disclaimer, the term of this patent is extended or adjusted under 35 U.S.C. 154(b) by 995 days.

(21) Appl. No.: 11/336,440

(22) Filed: Jan. 20, 2006

Related U.S. Application Data

(60) Provisional application No. 60/646,345, filed on Jan. 24, 2005.

(51) Int. Cl.
*G09G 5/08* (2006.01)
(52) U.S. Cl. .................................................. 345/163
(58) Field of Classification Search .................. 345/163, 345/161, 167
See application file for complete search history.

(56) References Cited

U.S. PATENT DOCUMENTS

| | | | |
|---|---|---|---|
| 5,157,381 A | * | 10/1992 | Cheng ........................ 345/163 |
| 5,731,807 A | | 3/1998 | Feierbach |
| 5,963,195 A | | 10/1999 | Gregg et al. |
| 6,031,522 A | | 2/2000 | Strand |
| 6,198,473 B1 | * | 3/2001 | Armstrong .................. 345/163 |
| 6,348,912 B1 | | 2/2002 | Smith |
| 6,362,811 B1 | * | 3/2002 | Edwards et al. ............. 345/163 |
| 6,545,665 B2 | * | 4/2003 | Rodgers ..................... 345/163 |
| 6,590,564 B1 | * | 7/2003 | McLoone et al. ........... 345/163 |
| 2006/0007151 A1 | * | 1/2006 | Ram .......................... 345/163 |

* cited by examiner

Primary Examiner—Regina Liang

(57) ABSTRACT

An ergonomically configured computer mouse comprising a hand held housing body having one or more features to provide comfort in the operation of said mouse. For example, it may include a covering of a pliable memory material designed to yield to the impression of the user's palm and resile to its initial shape after use. As another example, the mouse may be provided with finger detents to facilitate handling of the mouse. Furthermore, the mouse can have a pair of aligned buttons for inputting information into the computer, or a scrolling mechanism, preferably in the form of a rocker switch, in proximity to the aligned buttons for activation with the user's index finger.

16 Claims, 3 Drawing Sheets

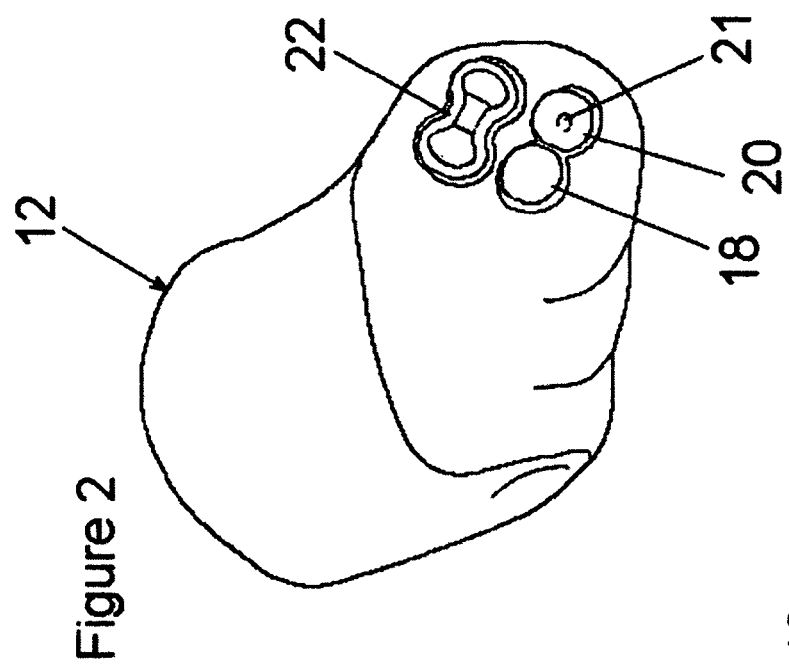
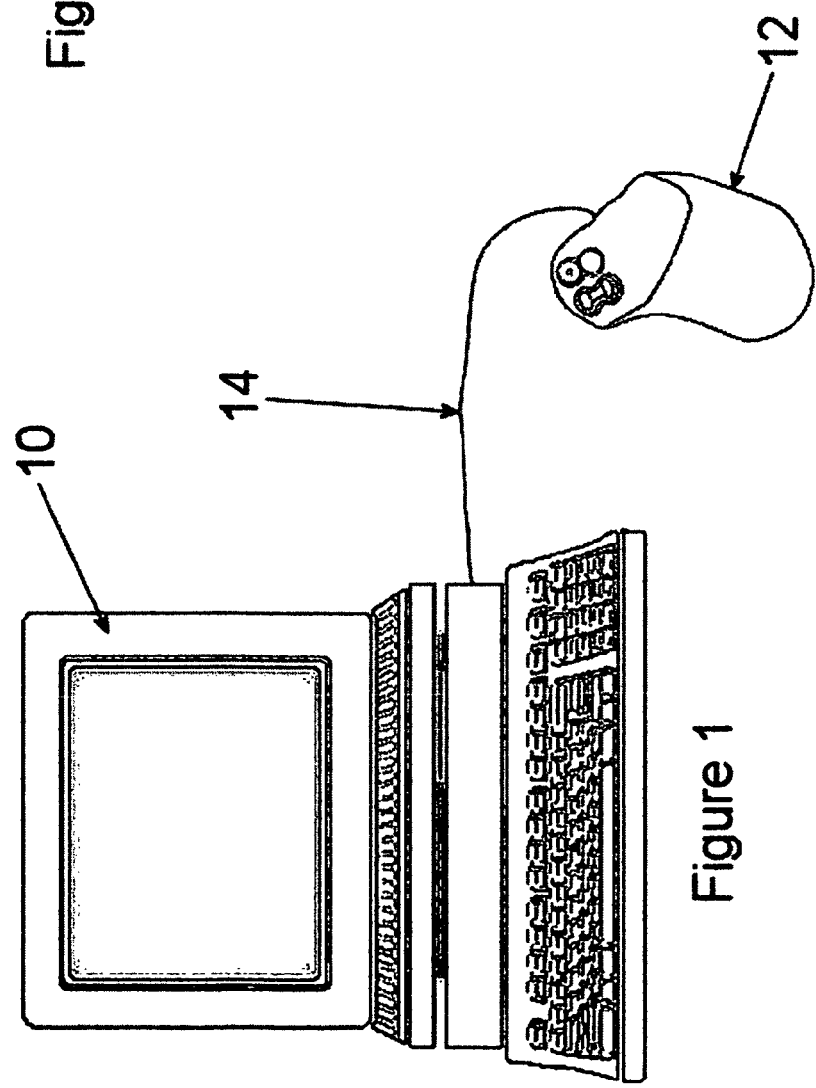

ERGONOMIC COMPUTER MOUSE

PRIORITY APPLICATION

This application is related to and claims the benefit of Provisional Application Ser. No. 60/646,345, filed Jan. 24, 2005, under the title Ergonomic Mouse by the inventor hereof.

FIELD OF INVENTION

This invention is directed to the field of computer aids, more particularly to computer mouse which is used as an input device to computers. Specifically, this invention relates to a customized computer mouse adapted to dynamically conform to the shape of an individual's hand, regardless of the individual, whenever he/she operates the mouse, and enable such individual to use a single finger to comfortably operate the mouse. Cramping often results whenever the individual must hold their finger "up" so as not to depress the mouse button, or rest their hand on a hard unsupportive surface.

BACKGROUND OF THE INVENTION

The computer mouse has been used for many years as an input device with desktop and laptop computers. The computer mouse is used to position a cursor at a selected location on a computer screen. If a button on the computer mouse is activated at the selected location, then the software running on the computer responds in a predetermined manner.

While efforts have been made to improve the ergonomic nature of computer mice, the fact remains that no two people have the same size and shape hands, and there is no computer mouse that allows the individual to operate the device with one finger, and no computer mouse that allows the individual to rest their finger on the mouse button without activating the software, or moving the cursor.

Recent studies claim that one of the most significant increases in the number of people who are being afflicted with carpal tunnel syndrome and repetitive strain injuries is due to the continuous rise in the use of computers. The number of computer users has increased from 5 million to 50 million in just the past 10-years, and the young age at which children begin using computers is going to create an even larger epidemic of carpal tunnel syndrome and repetitive strain injuries in the near future. Children are especially affected by the difficulty in operating an ordinary mouse.

SUMMARY OF THE INVENTION

The invention is a mouse that conforms to an individual's hand to provide comfort in the operation of said mouse. In one implementation, it is molded to ergonomically fit to an individual's hand, and has a pliable material that surrounds and supports the palm of the hand as it rests on the mouse. The pliable material covers an electronic base assembly, which includes standard circuitry to generate a mouse output signal for application to a computer. This allows the invention to be used with new or older computers. In another implementation, the mouse is designed to allow the individual to rest the index finger on the buttons of the mouse to relieve the pressure of the joints and tendons of the hand and fingers, and to operate the mouse with only the index finger. The mouse also has indentations for the small finger and the thumb to provide maximum control of the mouse.

Accordingly a feature of the invention is the pliable, conforming material that covers the electronic base assembly that dynamically contours to the individual's hand whenever he uses the mouse.

Another feature is the one finger design. This feature eliminates the need to use multiple fingers to operate the mouse.

Another feature is the option to adjust the actuation force required to invoke a computer command via a mouse, allowing the ability to rest your finger on the mouse button without operating the computer.

Another feature is the multi-position rocker switch. The rocker switch has a neutral setting in the middle, a page up/page down setting, and a scroll up/scroll down setting.

Still another feature is the arrangement of the buttons. This invention has the buttons arranged in a line, parallel to the movement of the individual's index finger instead of arranging the buttons on the left and right, and the buttons are staggered to allow the individual to rest his index finger on both buttons at the same time.

Yet another feature is the indentations on the side of the mouse for the small (pinky) finger, and the thumb to allow greater control of the mouse.

BRIEF DESCRIPTION OF THE DRAWINGS

The features and functions of the invention will be better understood in light of the following drawings and the associated description of said drawings.

FIG. 1 is a perspective view of a conventional personal computer showing a hard wired computer, ergonomically constructed, mouse for operating the computer according to this invention.

FIG. 2 is a top perspective view of a right hand operated mouse of the invention, optionally showing a scrolling feature for the mouse.

DETAILED DESCRIPTION OF THE INVENTION

Figure 4:
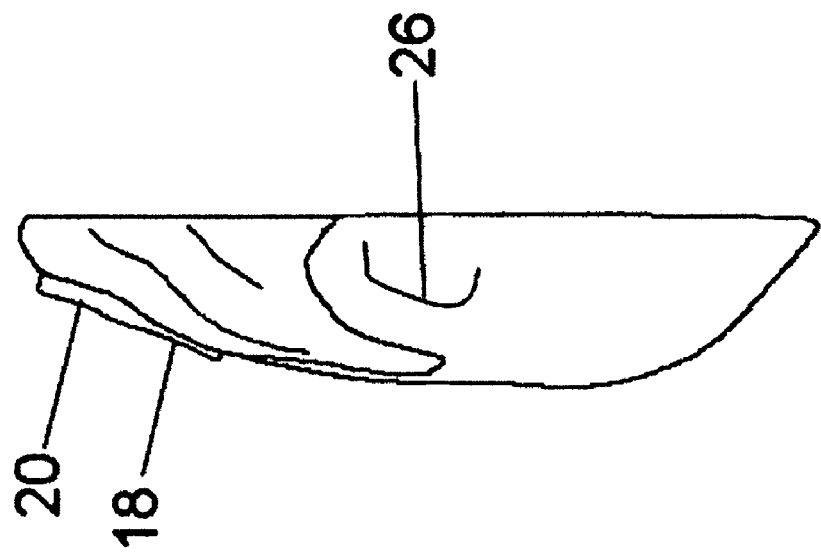
FIG. 4 is a side view of the mouse of FIG. 3, where finger indentations are illustrated.

The present invention relates to a computer mouse that conforms to an individual's hand to provide comfort in the operation of said mouse. As known in the art, a mouse is a palm-sized device in electrical communication with a computer, either hard wired or remote, equipped with one or more buttons, used to point at and select items on a computer display screen with the displayed pointer controlled by means of analogous movement of the mouse on a nearby flat surface. In one implementation, a mouse is disclosed which is molded to ergonomically fit to an individual's hand, and has a pliable material that surrounds, supports, and comforts the palm of the hand as it rests on the mouse. The pliable material covers an electronic base assembly, which includes standard circuitry to generate a mouse output signal for application to a computer. The pliable material may be memory foam or other similar material that conforms to the individual's hand when resting on the mouse, and resumes its initial shape once the hand is removed. In another implementation, the mouse is designed to allow the individual to rest his hand on the mouse to relieve the pressure of the joints and tendons of the hand and fingers.

On a standard mouse the buttons are extremely sensitive. Simply placing a finger on a button is enough to invoke a computer command, often frustrating the individual using the computer. The individual must suspend his finger over the button until he is ready to invoke the command on the computer. This often leads to cramping and hand fatigue. One implementation of this invention eliminates that problem by requiring a force of between 1 ounce and 10 ounces of actuation pressure to invoke a command. In another implementation of this invention, this force can be adjusted via a software control or a mechanical control. This is sufficient to rest a finger on the button without inadvertently invoking a command, but does not require the individual to exert exorbitant pressure to invoke a command. Another implementation of this invention eliminates the side by side arrangement of the left (pick) and right (enter) buttons. Arranging the buttons in a line, and having one button (pick) slightly raised over the other (enter) frees the individual to operate the mouse with only his index finger. Furthermore in a standard mouse the scroll wheel is located between the two buttons, or on the side of the mouse. Yet another implementation of this invention replaces the scroll wheel with a rocker switch and moves it conveniently located to the left of the buttons to provide one finger operation using only the index finger.

The mouse also has indentations for the small finger and the thumb to provide maximum control of the mouse. The contributions of this invention, and its ability to provide assistance to the computer user, will become apparent in the following discussion and drawing.

Some, all, or additional features as described herein may be included in alternate implementations.

Figure 3:
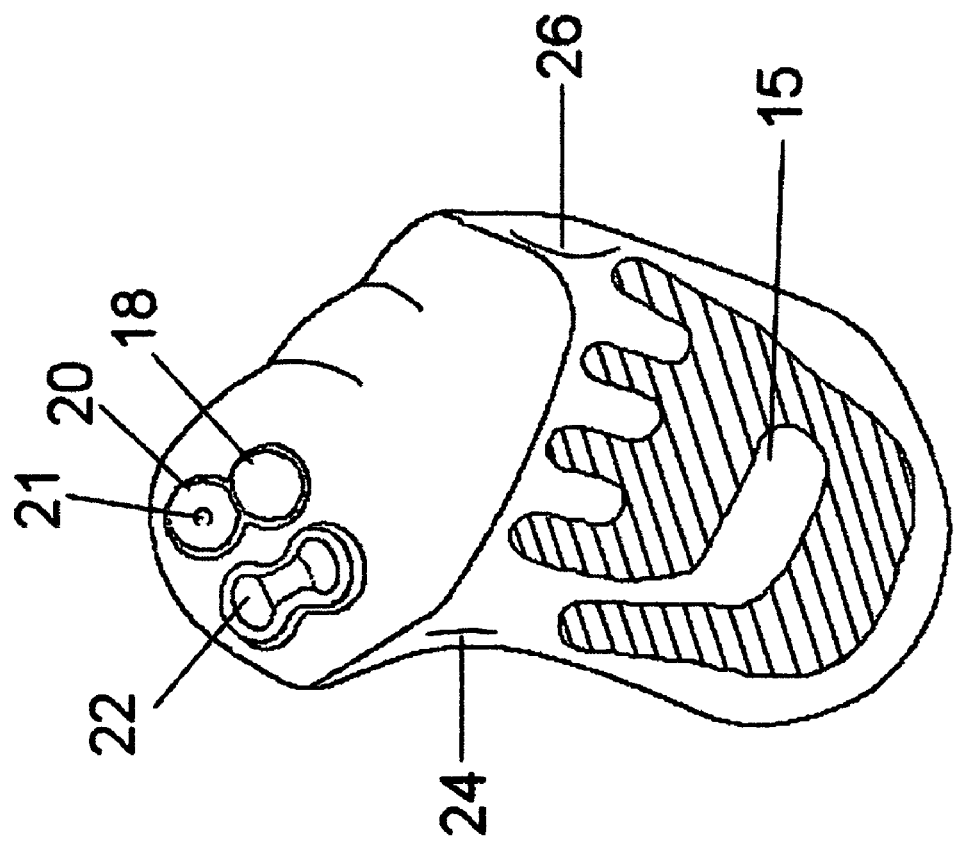
FIG. 3 is a top perspective view of the mouse of FIG. 2, further showing the pliable conforming material and a typical palm print formed during use of the mouse by an individual.

FIG. 1 is a perspective view of a conventional computer 10, as known in the art, with the mouse 12 of the invention in hard wired communication via cable 14. However, as noted previously, the mouse hereof may be in remote communication with the computer via a wireless link, such as may be used with a portable laptop computer. Continuing now with details of the mouse 12 of the invention, FIGS. 2 through 4 illustrate several views of one or more implementations of the mouse 12 of the invention. The mouse functions as any ordinary mouse, however, there are several unique and unobvious features to said invention. The mouse is covered with a pliable material 15 that conforms to the hand of the individual for as long as the individual's hand rests on the mouse. After use, the pliable material resiles to its original shape. If another individual places their hand on the mouse the same pliable material conforms to that person's hand, thereby dynamically adjusting to each individual's hand. Thus the hand is lifted off the mouse, the pliable material returns to its previous shape. The pliable conforming material 15 overlays the hard mouse housing, where the latter is known in the art. When the individual places his hand on the mouse, their small finger (pinky) finger fits in the dimpled area 26 along the side. An ordinary mouse typically has two buttons, the "pick" and the "enter" buttons. With the mouse 12, these buttons are located on the left and right respectively. The thumb rests in the designated area 24, along the opposite side, while the index finger rests on the "pick" 20 and "enter" 18 buttons. The remaining fingers rest comfortably between the index and small fingers. Although the individual can rest their fingers on the buttons without invoking a computer command the fingers are still invoking pressure on said buttons. The buttons hereof simply require a greater force than the standard mouse. This prevents the cramping and discomfort many users of the typical mouse complain about. To scroll up and down on the computer screen, the individual places the index finger on the rocker switch 22. Depressing the top of the switch moves the cursor up, and depressing the bottom of the rocker switch the cursor moves down.

The side view of FIG. 4 shows the dimple 26 created for the small (pinky) finger. This view also displays the different heights of the buttons. The taller "pick" button 20, and the shorter "enter" button 18 allows the individual to rest their index finger comfortably on the buttons without inadvertently activating said buttons.

FIG. 3 is a perspective view of the mouse 12 from the back. All the features of the invention are captured in this view, the pliable material 15, the small finger 26 and thumb dimples 24, the "pick" 20 and "enter" buttons 18, a small positioning bump 21 marking the home finger position ("left-click"), and the rocker switch 22. The rocker switch has five positions. The middle portion of the rocker switch is neutral i.e. the cursor does not move if the finger rests on that location. Depressing the top portion of the rocker switch moves the cursor up a page length. Depressing the rocker switch in the intermediate area between the neutral and the top portion of the rocker switch allows the cursor to scroll up. Depressing the bottom portion of the rocker switch moves the cursor down a page length. Depressing the rocker switch in the intermediate area between the neutral and the bottom portion of the rocker switch allows the cursor to scroll down.

Additionally, FIG. 3 further shows a simulated palm impression as it may appear on a just used mouse 12 featuring the pliable material 15 covering the mouse housing containing the necessary circuitry for operating the computer, as known in the art. However, after such use the material 15 will resile with the palm impression disappearing to facilitate use by another individual.

Figure 6:
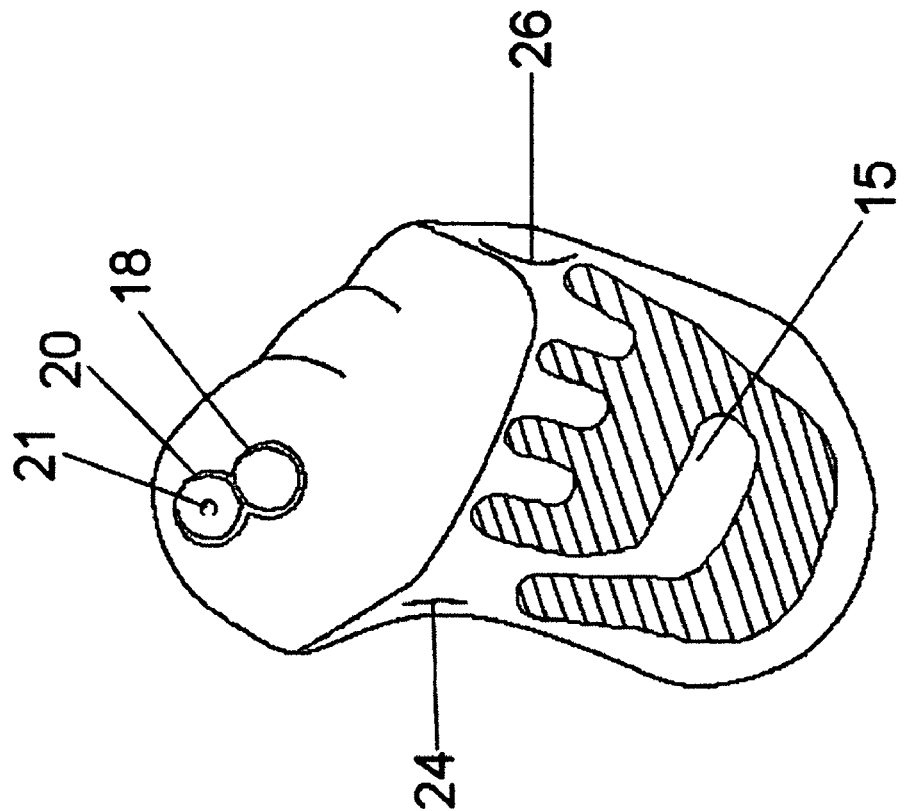
FIG. 6 is a top perspective view, similar to FIG. 3, showing only a pair of 'right click' and 'left click' buttons.
Figure 5:
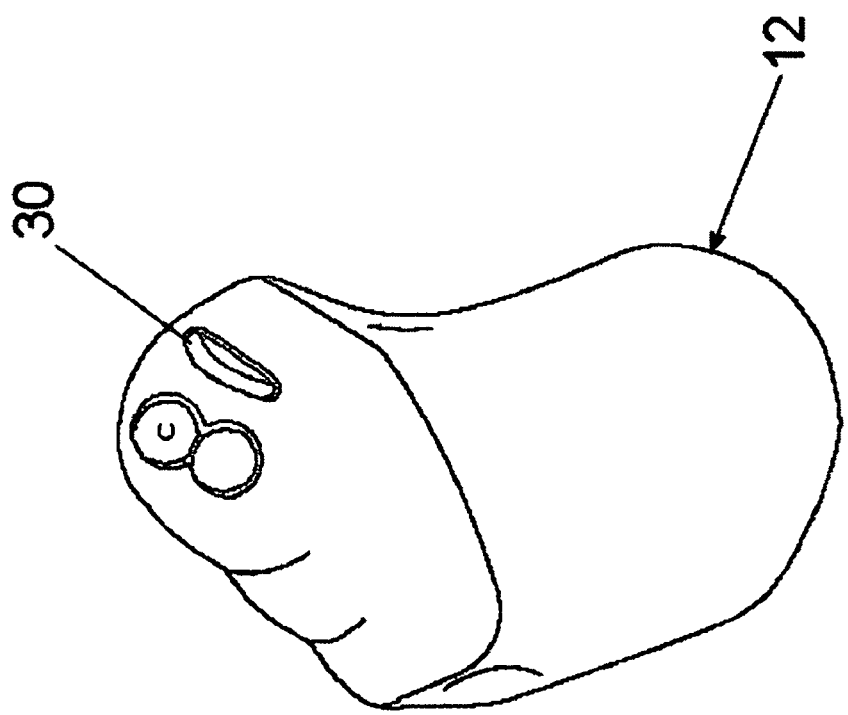
FIG. 5 is a top perspective view of a left hand operated mouse of the invention, further showing a scroll wheel in proximity to 'right click' and 'left click' buttons.

FIGS. 5 and 6 illustrate additional embodiments for the mouse 12 of this invention. For example, while most mouse devices are designed for right-handed use, FIG. 5 shows a left-handed mouse. Further, rather than using the preferred rocker switch, a conventional scroller wheel 30 may be incorporated into the mouse of this invention. Also, the scroll features are removed from the mouse. From the discussions above regarding the several Figures, it is apparent that the invention hereof offers a number of unique advantages:

The position of the buttons allows for all operations of the mouse to be performed with only the index finger. Small finger-sized mouse operation buttons replace the traditional large-sized left- and right-oriented buttons, allowing them to be closely spaced for one-finger operation. A small positioning bump is placed in the center of the upper button to clearly mark the home finger position ("left-click").

The downward force required to activate the buttons is such that the finger may rest entirely on the buttons without accidentally activating the mouse.

Rocker switch with a grooved indentation for finger positioning may replace the "roller wheel" that is commonly used for scrolling up and down on web pages. This allows either fast or slow scrolling up and down a page simply by sliding the finger up or down on the switch. The "neutral position" of the rocker switch, when depressed, allows page scrolling by mouse movement rather than switch operation.

Unique ergonomic shape is designed with finger indentations to allow the mouse to be gripped comfortably between the thumb and three outer fingers.

The entire palm area is covered by a pliable material, such as memory foam or similar shape-conforming foam or gel product that temporarily conforms to fit each user's hand and gradually returns or resiles to its original state after use. This allows this portion of the mouse to temporarily and comfortably conform to each individual user's hand.

It is recognized that changes, variations and modifications may be made to the ergonomically constructed computer mouse of this invention without departing from the spirit and scope thereof. Accordingly, no limitation is intended to be imposed therein except as set forth in the accompanying claims.

I claim:

1. An ergonomically configured computer mouse being operable to communicate with a computer, said mouse comprising:
   a hand held housing body having a generally flat base for sliding movement along a supporting surface, and a curved upper surface terminating in opposing side wall sections,
   said upper surface further including only two buttons a taller pick button and a shorter enter button, closely positioned together for inputting information to said computer, where said buttons are operable by a single index finger,
   a pliable memory material covering an entire palm area, wherein said memory material is dynamically adjustable whereby it yields to the impression of the user's palm and resiles to its initial shape after each use, and,
   said side wall sections including finger depressions for respectively positioning the user's thumb and little finger.

2. The ergonomically configured computer mouse according to claim 1, wherein one of said buttons has an upwardly extending protrusion from its face.

3. The ergonomically configured computer mouse according to claim 2, including a scrolling mechanism in proximity to said pair of closely positioned buttons.

4. The ergonomically configured computer mouse according to claim 3, wherein said scrolling mechanism is a rocker switch operable in plural operation modes.

5. An ergonomically configured computer mouse being operable to communicate with a computer, said mouse comprising:
   a hand held housing body having a generally flat base for sliding movement along a supporting surface, and a curved upper surface terminating in opposing side wall sections,
   said upper surface characterized by a dynamic pliable memory material covering an entire palm area, wherein said memory material is dynamically adjustable whereby it yields to the impression of the user's palm and resiles to its initial shape after each use,
   said upper surface further including only two buttons a taller pick button and a shorter enter button, closely positioned together for inputting information to said computer, where said buttons are operable by a single index finger,
   said buttons are pressure sensitive requiring at least a predetermined substantial application of pressure to activate said buttons, whereby to allow the user to rest his/her fingers without prematurely activating said buttons, wherein such pressure is adjustable, and
   said side wall sections including finger depressions for respectively positioning the user's thumb and little finger.

6. The ergonomically configured computer mouse according to claim 5, wherein one of said buttons has an upwardly extending protrusion from its face.

7. The ergonomically configured computer mouse according to claim 6, including a scrolling mechanism in proximity to said pair of closely positioned buttons.

8. The ergonomically configured computer mouse according to claim 7, wherein said scrolling mechanism is a rocker switch operable in plural operation modes.

9. An ergonomically configured computer mouse being operable to communicate with a computer, said mouse comprising:
   a hand held housing body having a generally flat base for sliding movement along a supporting surface, and a curved upper surface terminating in opposing side wall sections,
   said upper surface further including only two buttons a taller pick button and a shorter enter button, closely positioned together for inputting information to said computer, where said buttons are operable by a single index finger, and
   said side wall sections including finger depressions for respectively positioning the users thumb and little finger.

10. The ergonomically configured computer mouse according to claim 9, wherein said buttons are pressure sensitive requiring at least a predetermined substantial application of pressure to activate said buttons, whereby to allow the user to rest his/her fingers without prematurely activating said buttons, and wherein said pressure is adjustable.

11. The ergonomically configured computer mouse according to claim 10, wherein one of said buttons has an upwardly extending protrusion from its face.

12. The ergonomically configured computer mouse according to claim 11, including a scrolling mechanism in proximity to said pair of closely positioned buttons.

13. The ergonomically configured computer mouse according to claim 12, wherein said scrolling mechanism is a rocker switch operable in plural operation modes.

14. The ergonomically configured computer mouse according to claim 9, wherein one of said buttons has an upwardly extending protrusion from its face.

15. The ergonomically configured computer mouse according to claim 14, including a scrolling mechanism in proximity to said pair of closely positioned buttons.

16. The ergonomically configured computer mouse according to claim 15, wherein said scrolling mechanism is a rocker switch operable in plural operation modes.

* * * * *